US010284808B2

(12) United States Patent
Schwartz et al.

(10) Patent No.: US 10,284,808 B2
(45) Date of Patent: May 7, 2019

(54) SYSTEM AND METHOD FOR SUPPORTING SELECTIVE BACKTRACKING DATA RECORDING

(71) Applicant: SZ DJI TECHNOLOGY CO., LTD., Shenzhen (CN)

(72) Inventors: Sheldon Schwartz, Burbank, CA (US); Tao Wang, Shenzhen (CN); Mingyu Wang, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/942,862

(22) Filed: Apr. 2, 2018

(65) Prior Publication Data

US 2018/0227539 A1     Aug. 9, 2018

Related U.S. Application Data

(63) Continuation of application No. 15/349,958, filed on Nov. 11, 2016, now Pat. No. 9,973,728, which is a
(Continued)

(51) Int. Cl.
*H04N 9/80* (2006.01)
*G11B 27/00* (2006.01)
(Continued)

(52) U.S. Cl.
CPC ......... *H04N 5/9201* (2013.01); *G11B 27/036* (2013.01); *G11B 27/28* (2013.01);
(Continued)

(58) Field of Classification Search
USPC ................. 386/241, 239, 248, 278
See application file for complete search history.

(56) References Cited

U.S. PATENT DOCUMENTS 9,818,451 B1    11/2017 Tyagi et al.
2003/0018647 A1   1/2003 Bialkowski
(Continued)

FOREIGN PATENT DOCUMENTS

CN    1304613    7/2001
CN    1396758    2/2003
(Continued)

OTHER PUBLICATIONS

Decision for Grant issued by the Japanese Patent Office in counterpart Japanese Patent Application No. 2016-536996, dated Jun. 5, 2018.
(Continued)

*Primary Examiner* — Daquan Zhao
(74) *Attorney, Agent, or Firm* — Finnegan, Henderson, Farabow, Garrett & Dunner, LLP

(57) ABSTRACT

Systems and methods can support a data processing apparatus. The data processing apparatus can include a data processor that is associated with a data capturing device on a stationary object and/or a movable object. The data processor can receive data in a data flow from one or more data sources, wherein the data flow is configured based on a time sequence. Then, the data processor can receive a control signal, which is associated with a first timestamp, wherein the first timestamp indicates a first time. Furthermore, the data processor can determine a first data segment by applying the first timestamp on the data flow, wherein the first data segment is associated with a time period in the time sequence that includes the first time.

30 Claims, 12 Drawing Sheets

Related U.S. Application Data continuation of application No. PCT/CN2015/076015, filed on Apr. 7, 2015.

(51) Int. Cl.
| | | |
|---|---|---|
| *H04N 5/92* | (2006.01) | |
| *H04N 5/262* | (2006.01) | |
| *G11B 27/28* | (2006.01) | |
| *G11B 27/34* | (2006.01) | |
| *G11B 31/00* | (2006.01) | |
| *H04N 5/76* | (2006.01) | |
| *H04N 5/77* | (2006.01) | |
| *H04N 5/91* | (2006.01) | |
| *H04N 9/82* | (2006.01) | |
| *G11B 27/036* | (2006.01) | |
| *H04N 7/01* | (2006.01) | |
| *H04N 7/015* | (2006.01) | |
| *H04N 5/93* | (2006.01) | |

(52) U.S. Cl.
CPC ............ *G11B 27/34* (2013.01); *G11B 31/006* (2013.01); *H04N 5/2628* (2013.01); *H04N 5/76* (2013.01); *H04N 5/7605* (2013.01); *H04N 5/77* (2013.01); *H04N 5/772* (2013.01); *H04N 5/91* (2013.01); *H04N 5/9202* (2013.01); *H04N 5/9205* (2013.01); *H04N 5/9206* (2013.01); *H04N 7/015* (2013.01); *H04N 7/0125* (2013.01); *H04N 9/8205* (2013.01); *H04N 9/8233* (2013.01)

(56) References Cited

U.S. PATENT DOCUMENTS

| | | |
|---|---|---|
| 2003/0093790 A1 | 5/2003 | Logan et al. |
| 2004/0175047 A1 | 9/2004 | Gormish et al. |
| 2005/0033758 A1 | 2/2005 | Baxter |
| 2005/0052469 A1 | 3/2005 | Crosby et al. |
| 2007/0019072 A1 | 1/2007 | Bengtsson et al. |
| 2007/0174774 A1 | 7/2007 | Lerman et al. |
| 2007/0179979 A1 | 8/2007 | Folgner et al. |
| 2007/0239787 A1 | 10/2007 | Cunningham et al. |
| 2010/0118150 A1 | 5/2010 | Boland et al. |
| 2011/0008024 A1 | 1/2011 | Sasaki |
| 2011/0206351 A1 | 8/2011 | Givoly |
| 2013/0302010 A1 | 11/2013 | Kuo et al. |
| 2014/0211987 A1 | 7/2014 | Fan et al. |
| 2014/0300807 A1 | 10/2014 | Kamiya |
| 2015/0009347 A1 | 1/2015 | O'Donnell et al. |
| 2016/0129999 A1 | 5/2016 | Mays |
| 2017/0064247 A1 | 3/2017 | Schwartz et al. |

FOREIGN PATENT DOCUMENTS

| | | |
|---|---|---|
| CN | 101167134 A | 4/2008 |
| CN | 101312535 | 11/2008 |
| CN | 101557483 A | 10/2009 |
| CN | 101681665 | 3/2010 |
| CN | 101740082 | 6/2010 |
| CN | 101753941 | 6/2010 |
| CN | 102215429 | 10/2011 |
| CN | 102685430 | 9/2012 |
| CN | 103096184 | 5/2013 |
| CN | 103313122 A | 9/2013 |
| CN | 103412746 | 11/2013 |
| CN | 103490842 | 1/2014 |
| CN | 103716712 | 4/2014 |
| CN | 103761985 | 4/2014 |
| CN | 103856806 A | 6/2014 |
| CN | 103916535 | 7/2014 |
| CN | 104052935 | 9/2014 |
| EP | 1095507 | 5/2001 |
| JP | 11-176137 | 7/1999 |
| JP | 2002-297630 | 10/2002 |
| JP | 2003-256432 | 9/2003 |
| JP | 2004-320233 | 11/2004 |
| JP | 2005-109566 | 4/2005 |
| JP | 2006-303594 A | 11/2006 |
| JP | 2006-3003594 | 11/2006 |
| JP | 2008-227860 | 9/2008 |
| JP | 2009-55152 | 3/2009 |
| JP | WO 2008-136466 | 7/2010 |
| JP | 2011-7592 | 1/2011 |
| JP | 2012-49840 | 3/2012 |
| JP | 2014-59773 | 4/2014 |
| WO | WO 94/29868 | 12/1994 |

OTHER PUBLICATIONS

Office Action dated Feb. 5, 2018, by the Chinese Paten Office in counterpart Chinese Patent Application No. 201480042333.9.

Kitada With restriction of Hiroyasu, NHK '32 program technical exhibition', and broadcast art, ** 6 hall publication incorporated company, May 1, 2003, No. 5, $56^{th}$ volume, pp. 136-141.

"Decision to Decline the Amendment," dated Nov. 30, 2017, from the Japanese Patent Office in counterpart Japanese Patent Application No. 2016-536996.

Sasahara T., "Video α", "Adobe CS3 Production Premium a la carte $2^{nd}$—Video editing function of Photoshop CS3 Extended", video α Shashin Kogyo Publisher Inc., 233, pp. 76-92.

"Thorough Comparison—Movie editing software programs", PC Fan, Malnichi Communication Inc., vol. 15, No. 16, pp. 176-181, Aug. 2008.

Yamaguchi, R., et al., "Final Cut Pro X—Super reference for Macintosh", First Edition, Sotechsha Co. Ltd., pp. 64, 65, 70, and 71, Sep. 2011.

Sugawara, S., "Codex Digital uncompressed disc recording system Portable", video α, Shashin Kogyo Publisher Inc.. Issue 245, pp. 55-58, Sep. 2008.

ASCII dot PC, ASCII Corporation, No. 81, pp. 36-43, Feb. 2005.

English-language extended Search Report from the European Patent Office in counterpart European Application No. EP 15 86 8884.6 dated Apr. 5, 2017.

International Search Report dated Sep. 18, 2015, issued by the State Intellectual Property Office of the P.R. China in counterpart International Application No. PCT/CN2015/076015; 4 pages.

Written Opinion of the International Search Authority dated Sep. 18, 2015, issued by the State Intellectual Property Office of the P.R. China in counterpart International Application No. PCT/CN2015/076015; 4 pages.

Omorl et al., "Waveform-analysis apparatus determines frame number of video data with respect to position of analog signal waveform data based on number of measurement data per pulse of frame synchronization signal of video data" 2017, Derwent 2011-A56429.

Office Action dated Sep. 7, 2018, by the U.S. Appl. No. 15/598,170.

Chinese Office Action received from the Chinese Patent Office, dated Jul. 25, 2018.

SYSTEM AND METHOD FOR SUPPORTING SELECTIVE BACKTRACKING DATA RECORDING

CROSS-REFERENCE TO RELATED APPLICATIONS

This application is a continuation application of U.S. application Ser. No. 15/349,958, entitled "SYSTEM AND METHOD FOR SUPPORTING SELECTIVE BACKTRACKING DATA RECORDING," filed on Nov. 11, 2016, which is a continuation application of International Application No. PCT/CN2015/076015, entitled "SYSTEM AND METHOD FOR SUPPORTING SELECTIVE BACKTRACKING DATA RECORDING," filed on Apr. 7, 2015, both of which are hereby incorporated by reference in their entirety.

BACKGROUND OF THE INVENTION

The disclosed embodiments relate generally to data processing and more particularly, but not exclusively, to multimedia data recording.

Data recording, such as video recording, is traditionally an action in one direction along the timeline, where the past has already been settled and the future is yet to come. Typically, the data can be stored as soon as the recording starts. However, critical data, such as memorable moments, may still be missed since the user may not be able to start the recording in time.

On the other hand, there are physical limits that prevent a user from recording everything without qualification. For example, an unmanned aerial vehicle (UAV) may be used for a wide range of applications including surveillance, search and rescue operations, exploration, and other fields. As the image technology develops, the amount of image data that needs to be recorded can grow very fast. Thus, excessive bandwidth may be consumed, which prohibits the downloading of the captured video from an UAV.

This is the general area that embodiments of the invention are intended to address.

BRIEF SUMMARY OF THE INVENTION

Described herein are systems and methods that can support a data processing apparatus. The data processing apparatus can include a data processor that is associated with a data capturing device on a stationary object and/or a movable object. The data processor can receive data in a data flow from one or more data sources, wherein the data flow is configured based on a time sequence. Then, the data processor can receive a control signal, which is associated with a first timestamp, wherein the first timestamp indicates a first time. Furthermore, the data processor can determine a first data segment by applying the first timestamp on the data flow, wherein the first data segment is associated with a time period in the time sequence that includes the first time.

Also described herein are systems and methods that can support a data processing apparatus. The data processing apparatus can include a data processor that is associated with a data capturing device on a stationary object and/or a movable object. The data processor can store, in a memory, data received from one or more data sources in a time sequence. Then, the data processor can remove a portion of the data stored in the memory after receiving a synchronization signal. Furthermore, the data processor can forward the removed data to a storage, when a switch is turned on, for a time period in the time sequence.

Also described herein are systems and methods that can support a data processing apparatus. The data processing apparatus can include a data processor that is associated with a data capturing device on a stationary object and/or a movable object. The data processor can associate one or more tags with a data flow received from one or more data sources, wherein said one or more tags are associated with one or more timestamps. Then, data processor can save the one or more timestamps in a record. Furthermore, the data processor can select a subset of the data in the received data flow based on the one or more timestamps saved in the record.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses multimedia data recording as example for data recording. It will be apparent to those skilled in the art that other types of data recording can be used without limitation.

An Exemplary Data Recording System

Figure 1:
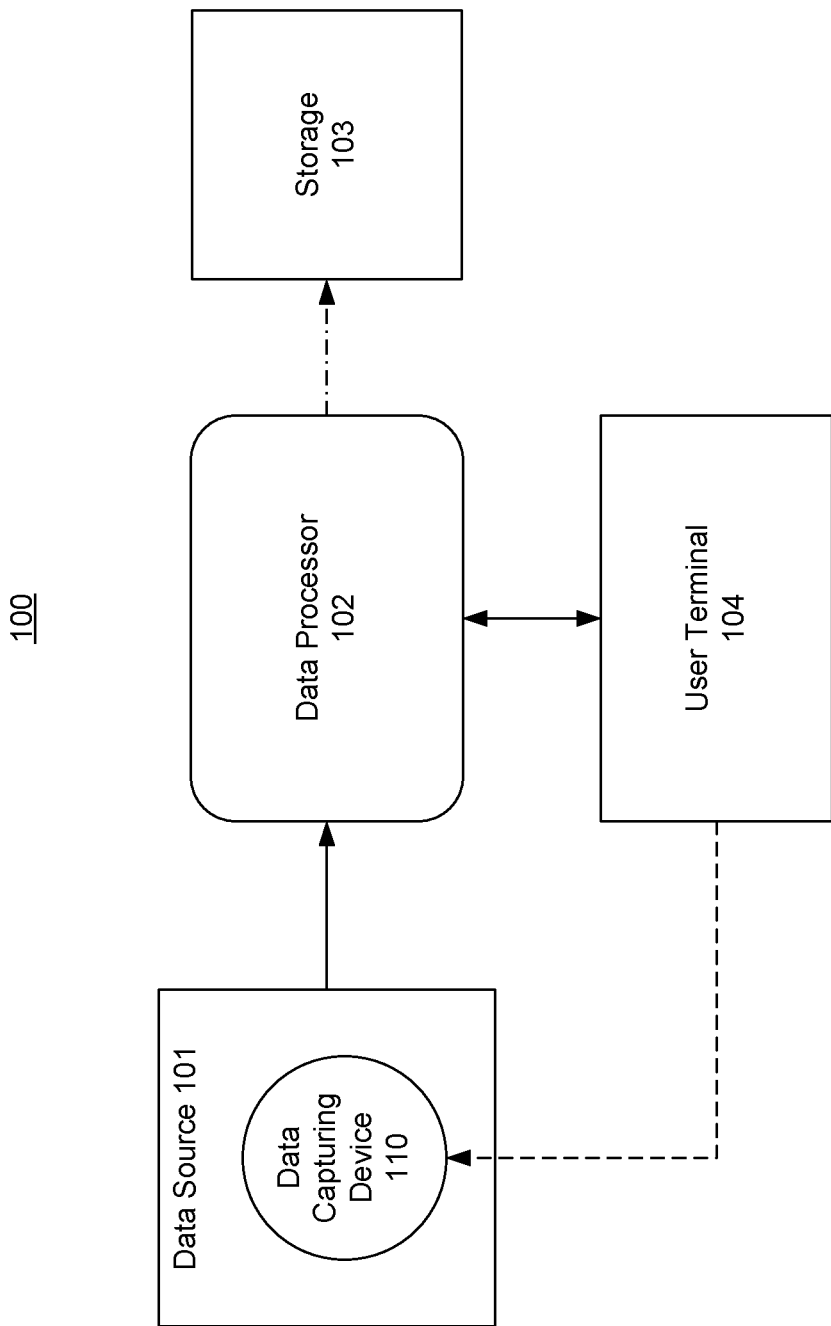
FIG. 1 is an exemplary illustration of a data recording system, in accordance with various embodiments of the present invention.

FIG. 1 is an exemplary illustration of a data recording system, in accordance with various embodiments of the present invention. As shown in FIG. 1, a data processing system 100 can include a data processor 102 that receives various types of data from a data source 101.

In accordance with various embodiments of the present invention, the data source 101 can be associated with a data capturing device 110. For example, an image sensor can be used for capturing the image or video information, while a microphone (MIC) can be used for capturing the audio information and a physical or virtual keyboard can be used for capturing the textual information.

Additionally, the data capturing device 110 can be placed on a stationary object and/or a movable object. For example, a stationary object may include a fixed monitoring device, while a movable object may include an unmanned aircraft, an unmanned vehicle, a hand held device (such as a camera), or a robot.

In accordance with various embodiments of the present invention, different communication protocols can be used to receive data from the one or more data sources. For example, the data source 101 can be physically connected to the data processor 102. Alternatively, the data source 101 can communicate with data processor 102 via wireless connection.

Different approaches can be used for controlling the data recording. The traditional approach is to start recording after a need is identified, such as when critical data is identified. This approach may not be ideal since the success of the recording depends on how fast the user can start the recording process and how responsive the system is.

Alternatively, the data processing system 100 can support selective backtracking data recording. For example, once started, the data capturing device 110 can be configured to keep on capturing data and pushes the captured data flow to the data processor 102 continuously. In the meantime, the data processor 102 may choose not to store the received data (i.e. abandoning the received data), unless an instruction, to perform otherwise, is received from a user or is prescribed by the system.

Then, the data processor 102 can export the selected data to a storage 103. For example, the data processor 102 can save the data into a storage medium that is physically connected. Alternatively, the data processor 102 may send the first data segment to a remote server via a network.

Thus, the selective backtracking data recording approach is beneficial, since there is no dependency on how fast the user can start the recording process and how responsive the system is.

Additionally, a user terminal 104 can be used for different purposes, such as controlling the data capturing device, and viewing the received data flow.

In accordance with various embodiments of the present invention, the data processor 102 can transmit a reduced set of the received data to a user terminal 104 for preview. For example, while the received data may contain data in multiple data types, the reduced set of the received data flow can only contain data in one data type.

Additionally, the user terminal 104, such as a handheld device, can be used for editing data captured by the data capture devices 110. For example, the user terminal 104 can be used for editing video captured by image capture devices on unmanned aerial vehicles (UAVs).

In some embodiments, the UAV may have an image capture device that captures video at a high definition and transmits the captured video to the handheld device at a low definition. The handheld device may receive and edit the captured video at the low definition and form a video edit request. The video edit request may be small in size and contain edited video data information for an edited video. The video edit request may then be transmitted to the UAV and/or image capture device. The UAV and/or image capture device may analyze the edited video file, generate a video file corresponding to the edited video data information, and transmit the generated video file to the handheld device or another device.

Therefore, the pressure on bandwidth for transmission and computation for video editing may be alleviated, since not all the high definition video is transmitted.

Selective Data Recording

Figure 2:
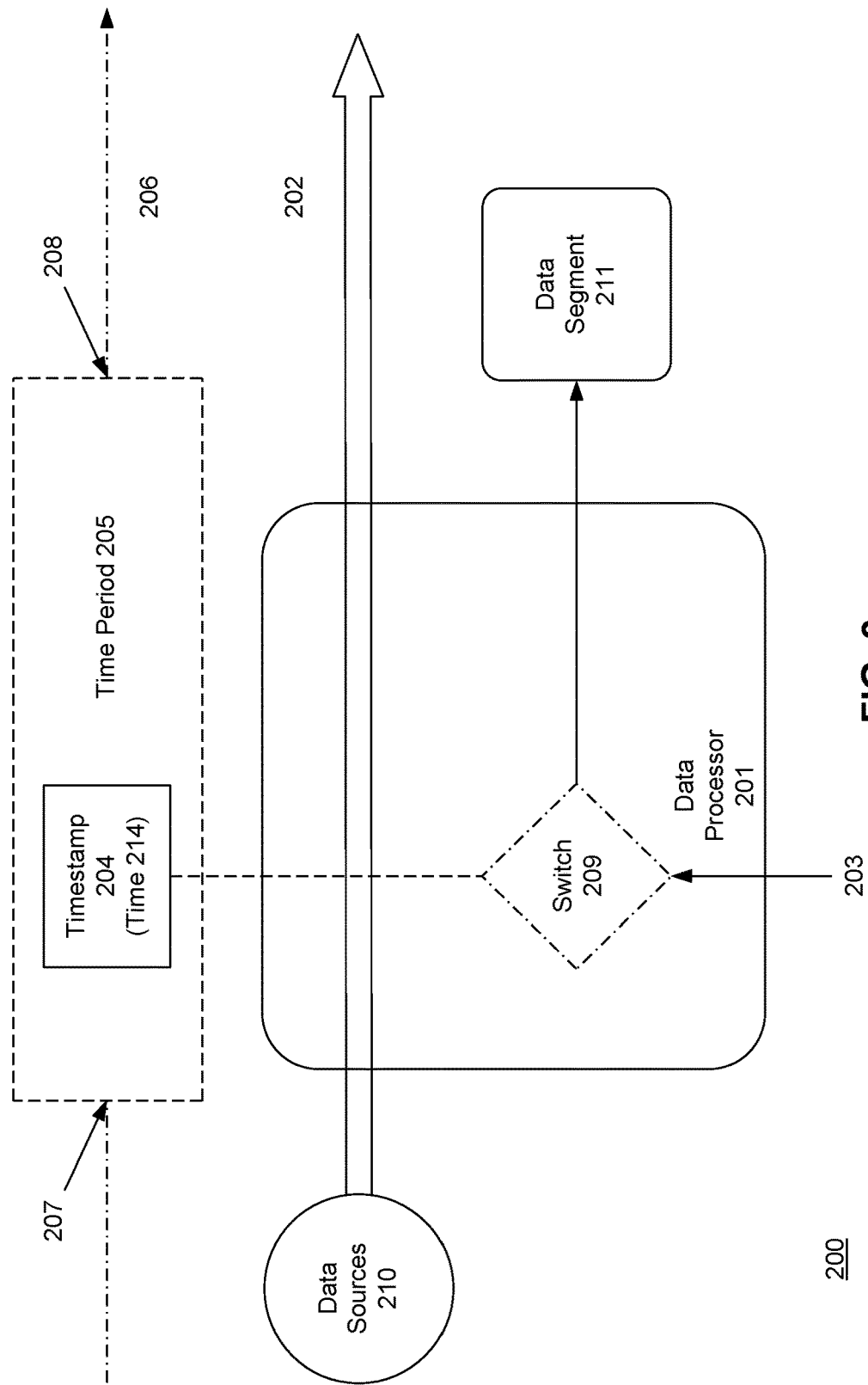
FIG. 2 is an exemplary illustration of selective data recording, in accordance with various embodiments of the present invention.

FIG. 2 is an exemplary illustration of selective data recording, in accordance with various embodiments of the present invention. As shown in FIG. 2, a data processing system 200 can include a data processor 201 that can receive data in a data flow 202 from a data source 210.

In accordance with various embodiments of the present invention, the data flow 202 may include different types of information. For example, the data in a data flow 202 may contain audio data that are captured using a microphone; video data that are captured using an image sensor; and/or textual data that are captured using a physical or virtual keyboard.

Furthermore, the data flow 202 can be configured based on a time sequence 206. For example, the time sequence can be defined based on a clock time, and/or a system defined time (such as image frame counts).

As shown in FIG. 2, the data processor 201 can receive a control signal 203. The control signal 203 may be triggered by a button being pushed, a gesture of a being, a movement of an object, and/or a change of a state, and generated by a user terminal, a motion detector, a state monitor, and/or a data analyzer.

Furthermore, the control signal 203 is associated with a timestamp 204, which indicates (or represents) a time 214 in the time sequence 206. When the data processor 201 receives the control signal 203, the data processor 201 can apply the timestamp 204 on the data flow 202, to determine a data segment 211 that is associated with a time period 205 in the time sequence 206.

As shown in FIG. 2, the time period 205, from a starting time 207 to an ending time 208, includes the time 214. This indicates that the data segment 211 includes data received from both the time period before the time 214 (i.e. backtracking) and the time period after the time 214. Thus, the data processing system 200 can support selective backtracking data recording.

In accordance with various embodiments of the present invention, the data processing system 200 allows for the use of the reduced set of the received data flow, which may only contain data in one data type, for initiating the backtracking data recording.

Then, the data processor 201 can export the selected data segment 211 to a storage. For example, the data processor 201 can save the data segment into a storage medium that is physically connected. Alternatively, the data processor 201 may send the first data segment to a remote server via a network.

Figure 3:
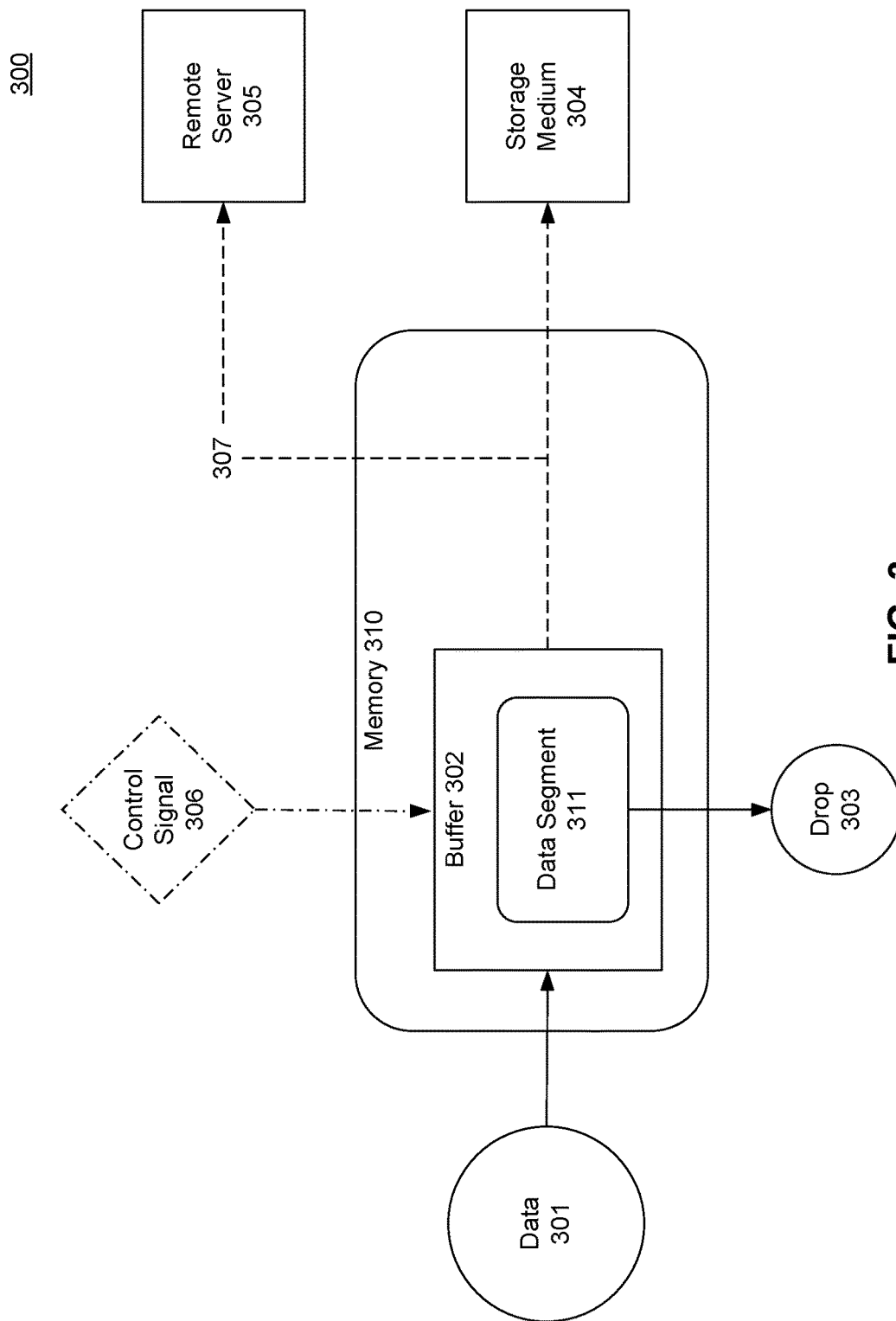
FIG. 3 is an exemplary illustration of using a buffer to support selective data recording, in accordance with various embodiments of the present invention.

FIG. 3 is an exemplary illustration of using a buffer to support selective data recording, in accordance with various embodiments of the present invention. As shown in FIG. 3, a data processing system 300 can take advantage of a buffer 302 in a memory 310 for handling the received data 301.

The data processing system 300 can use the buffer 302 for storing the received data 301 before removing it from the memory 310. For example, the data processing system 300 can drop 303 (a portion of) the data stored in the buffer 302 periodically, e.g. when receiving a frame synchronization signal and the buffer 302 is full. Furthermore, the size of the buffer 302 can be preconfigured. Alternatively, the size of the buffer 302 can be configured dynamically, e.g. based on policies.

Furthermore, the data processing system 300 can determine a data segment 311 after receiving a control signal 306 for storing the related data. The data segment 311 can include both past data stored in the buffer 302 and the data arriving as the time progresses.

Then, the data processing system 300 can export the data segment 311 to a storage. For example, the data processing system 300 can save the data segment into a storage medium 304 that is physically connected. Alternatively, the data processing system 300 may send the first data segment to a remote server 305 via a network 307.

Figure 4:
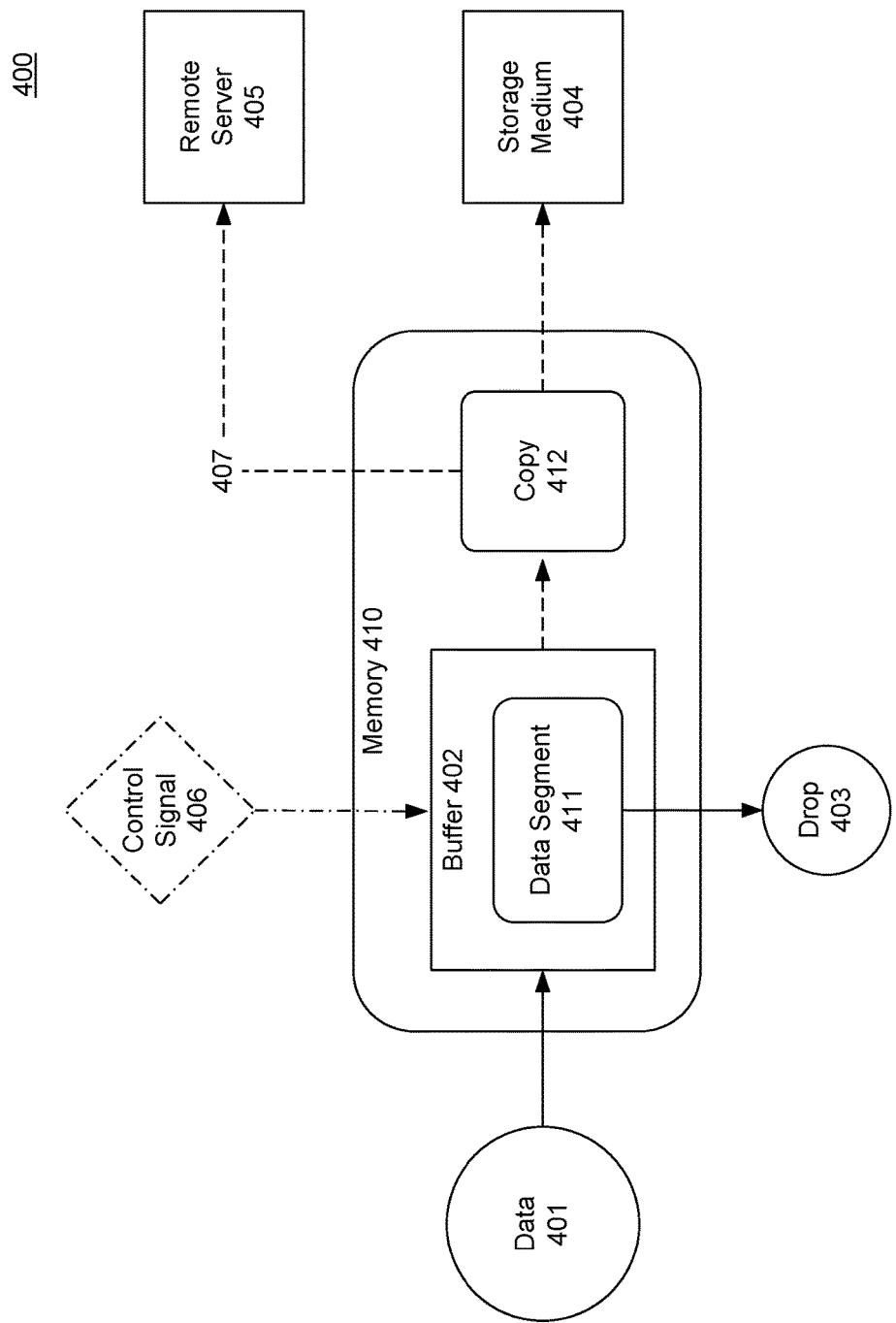
FIG. 4 is an exemplary illustration of an asynchronous selective data recording, in accordance with various embodiments of the present invention.

FIG. 4 is an exemplary illustration of an asynchronous selective data recording, in accordance with various embodiments of the present invention. As shown in FIG. 4, a data processing system 400 can take advantage of a buffer 402 in a memory 410 for handling the received data 401.

The data processing system 400 can use the buffer 402 for storing the received data 401 before removing it from the memory 410. For example, the data processing system 400 can drop 403 (a portion of) the data stored in the buffer 402 periodically, e.g. when receiving a frame synchronization signal and the buffer 402 is full. Furthermore, the size of the buffer 402 can be preconfigured. Alternatively, the size of the buffer 402 can be configured dynamically, e.g. based on policies.

As shown in FIG. 4, the data processing system 400 can create a copy 412 in the memory 410 for the data segment 411 when the data processing system 400 receives a control signal 406. Then, the data processing system 400 can export the copy of the data segment 411 at a later time (i.e. in an asynchronous fashion).

In accordance with various embodiments of the present invention, the data processing system 400 can export the data segment 411 to a storage. For example, the data processing system 400 can save the data segment into a storage medium 404 that is physically connected. Alternatively, the data processing system 400 may send the first data segment to a remote server 405 via a network 407.

Additionally, in order to save the overhead relating to establishing network connection, the data processing system 400 may be configured to export multiple data segments (each of which is associated with a different time period) in one action.

Figure 5:
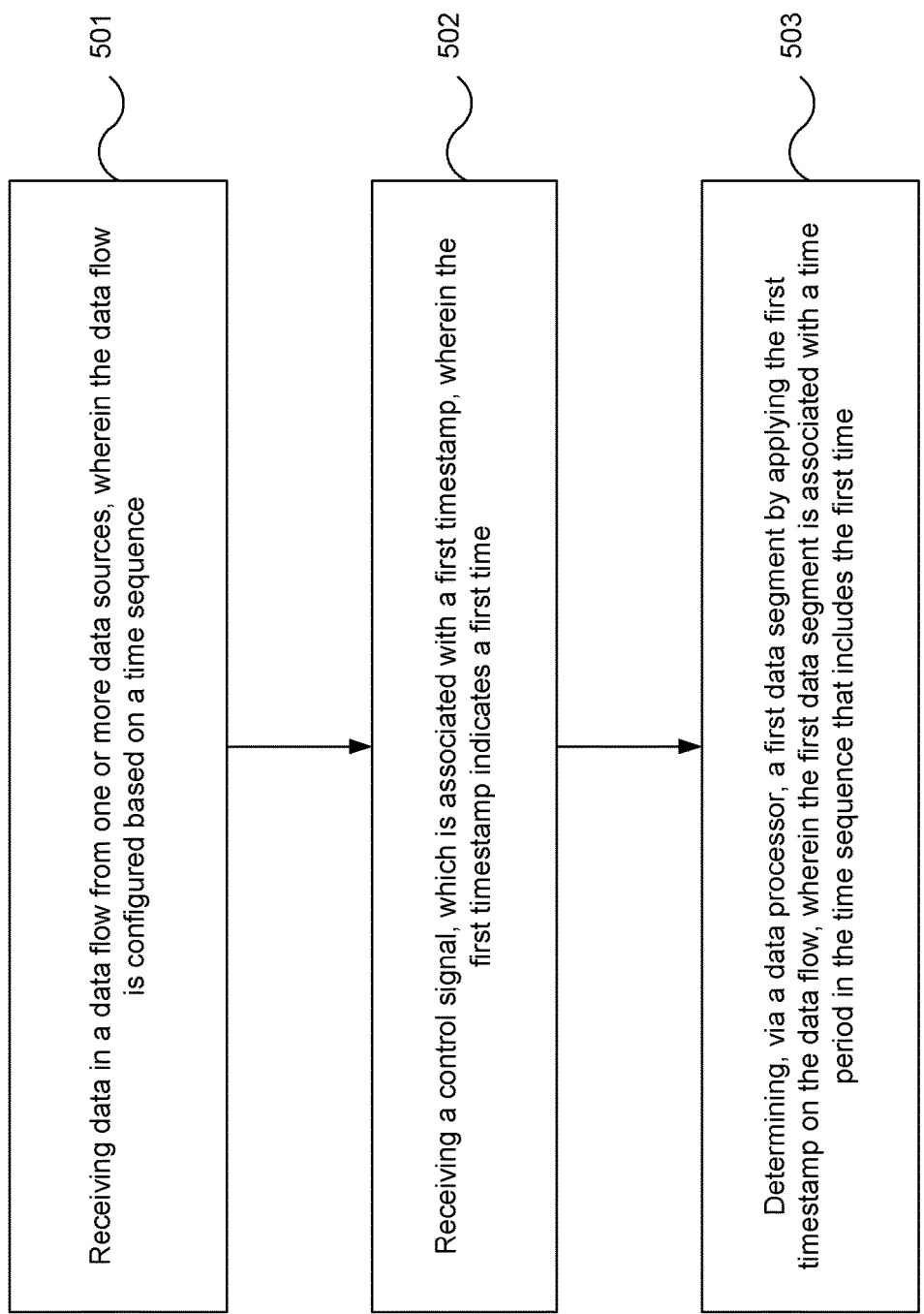
FIG. 5 shows a flowchart of selective data recording, in accordance with various embodiments of the present invention.

FIG. 5 shows a flowchart of selective data recording, in accordance with various embodiments of the present invention. As shown in FIG. 5, at step 501, a data processor can receive data in a data flow from one or more data sources, wherein the data flow is configured based on a time sequence. Then, at step 502, the data processor can receive a control signal, which is associated with a first timestamp, wherein the first timestamp indicates a first time. Furthermore, at step 503, the data processor can determine a first data segment by applying the first timestamp on the data flow, wherein the first data segment is associated with a time period in the time sequence that includes the first time.

Backtracking Data Recording

Figure 6:
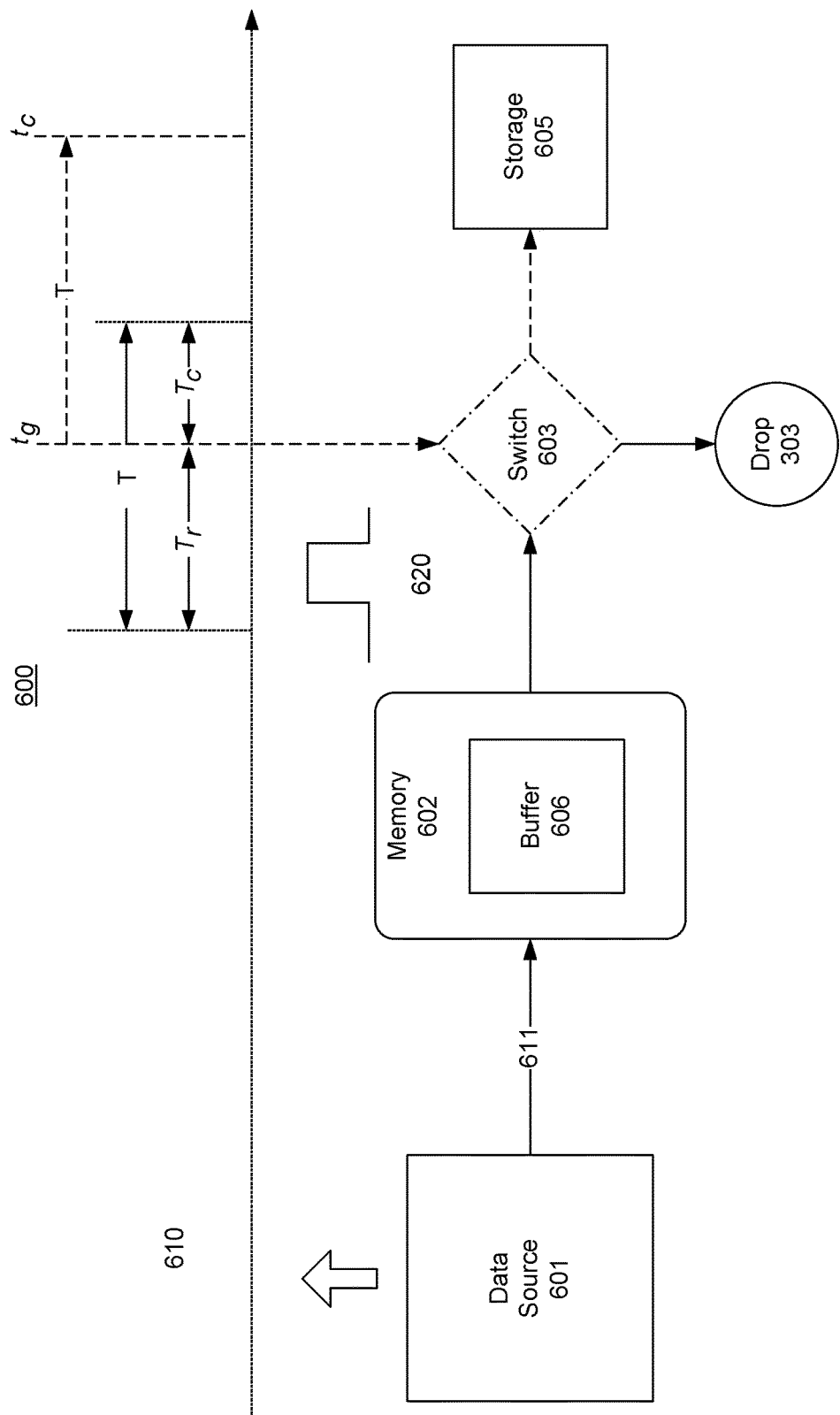
FIG. 6 is an exemplary illustration of backtracking data recording, in accordance with various embodiments of the present invention.

FIG. 6 is an exemplary illustration of backtracking data recording, in accordance with various embodiments of the present invention. As shown in FIG. 6, a data processing system 600 can take advantage of a buffer 606 in a memory 602 for handling the data 611, which are received from a data source 601. Additionally, the received data 611 can be associated with a time sequence 610. For example, the received data may contain one or more image frames, and the time sequence 610 can correspond to an image frame count.

In accordance with various embodiments of the present invention, the received data 611 can be stored in a memory 602, which may be based on a first-in-first-out (FIFO) protocol. Alternatively, other types of memory can be used without limitation. For example, the memory 602 can be based on a ring buffer or a list.

As shown in FIG. 6, the data processing system 600 can remove a portion of the data (e.g. one or more image frames) stored in the memory 602 periodically, e.g. after receiving a synchronization signal 620 (i.e. when new data arrives and the buffer 606 is full). Furthermore, the data processing system 600 can include a switch 603, which can be responsible for directing the data out of the memory 602.

The data processing system 600 can turn on the switch 603 after receiving a control signal. When the switch 603 is turned on, the data processing system 600 can export the data to a storage 605. The storage 605 can be based on a storage medium that connects to the memory 602 and/or a remote server that connects via a network. On the other hand, when the switch 603 is turned off, the data processing system 600 can drop 604 the data without storing it.

As shown in FIG. 6, the data processing system 600 receives a control signal at a time, tg. Once the switch 603 is turned on, the switch 603 can be maintained for a time period, T (i.e. from tg to tc in the time sequence 610). Here, the time period, T, can be preconfigured or prescribed. Alternatively, the time period, T, can be dynamically configured based on one or more policies.

In accordance with various embodiments of the present invention, the data processing system 600 can use a dynamically determined time, e.g. when the volume of a voice signal exceeds certain or when certain moving objects are detected in the scene, as the starting point and the ending point for the time period, T, as long as the memory is sufficient.

For example, the data processing system 600 can use video analysis technology to automatically identify the time when certain interesting object appears in the image. Then, the data processing system 600 can use this time as the starting point for the time period, T.

In accordance with various embodiments of the present invention, the data processing system 600 can support backtracking data recording. As shown in FIG. 6, the buffer 606 in the memory 602 can be used to store a number of image frames with variable sizes. There can be a number of images existing in the buffer 606, which may be configured to have a maximum image frame number, M.

Thus, for the time period, T, the stored data segment can include a past portion with a duration of Tr, which equals to the result of the maximum image frame number, M, divided by the image speed, fps, (i.e. M/fps). Additionally, the data segment can include a current portion with a duration of Tc, where Tc is the difference between the time period, T, and the duration for the past portion Tr (i.e. T−Tr).

In accordance with various embodiments of the present invention, the data processing system 600 can be optimized for different purposes, depending on how the memory 602 is configured. For example, the backtracking data recording can be configured for optimized memory usage or for optimized computation load (i.e. battery usage).

Figure 7:
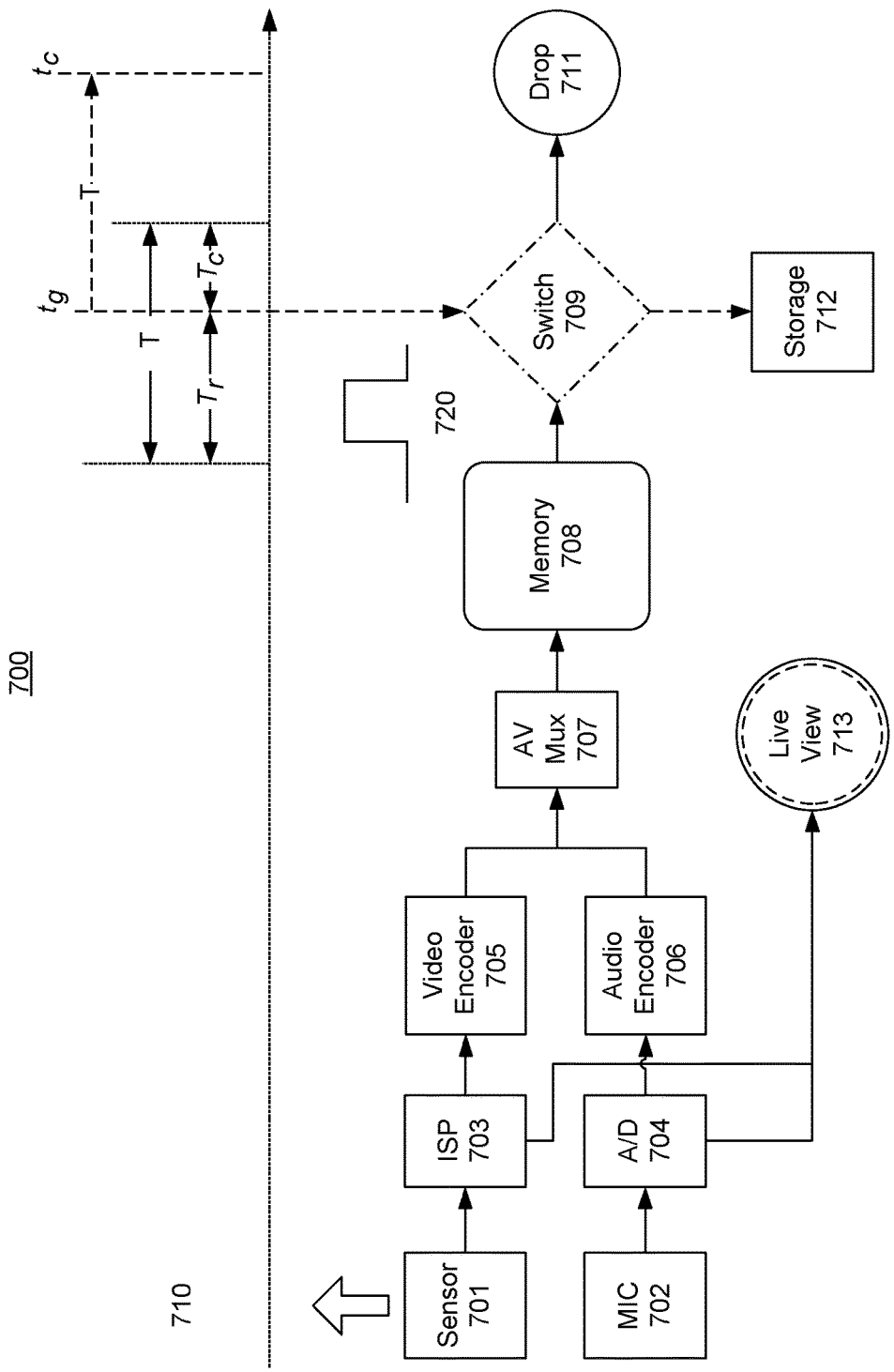
FIG. 7 is an exemplary illustration of backtracking recording optimized in memory usage, in accordance with various embodiments of the present invention.

FIG. 7 is an exemplary illustration of backtracking recording optimized in memory usage, in accordance with various embodiments of the present invention. As shown in FIG. 7, a data processing system 700 can take advantage of a memory 708 for handling the data received from a data source.

For example, the data processing system 700 can receive various image information from a sensor 701. Then, the data processing system 700 can use an image signal processor (ISP) 703 for transforming the image information into raw video data.

Additionally, the data processing system 700 can receive various analog voice information from a microphone (MIC) 702. Then, the data processing system 700 can use an analog/digital (A/D) converter 704 to convert the analog voice information into digital audio data.

Furthermore, the data processing system 700 can use different encoder for encoding, or compressing, the received data before storing the encoded data in the memory 708. For example, a video encoder 705 can be used for encoding the raw video data from the ISP 703, and an audio encoder 706 can be used for encoding the audio data from the (A/D) converter 704. Additionally, the data processing system 700 can use a multiplexer, e.g. AV Mux 707, for combining the separate audio data and video data into an audio/video (A/V) data stream.

Thus, the memory usage is optimized, since the received data are encoded or compressed before storing the encoded data in the memory 708 (on the other hand, more computation load may be required).

In accordance with various embodiments of the present invention, the memory 708 can be based on a first-in-first-out (FIFO) protocol. Alternatively, other types of memory can be used without limitation. For example, the memory 708 can be based on a ring buffer or a list.

Furthermore, the data processing system 700 can remove a portion of the data (e.g. one or more image frames) stored in the memory 708 periodically, e.g. after receiving a synchronization signal 720 (i.e. when new data arrives and the buffer is full).

As shown in FIG. 7, the data processing system 700 can include a switch 707 and a switch 709, which is responsible for directing the video data and the audio data out of the memory 708. The data processing system 700 can turn on the switch 709 after receiving a control signal. When the switch 709 is turned on, the data processing system 700 can direct the data to a storage 712. On the other hand, when the switch 709 is turned off, the data processing system 700 can drop 711 the data without storing it.

As shown in FIG. 7, the data processing system 700 receives a control signal at a time, tg. Once the switch 709 is turned on, the data processing system 700 can maintain the switch 709 for a time period, T (i.e. from tg to tc in the time sequence 710).

Thus, the data processing system 700 can support backtracking data recording. A buffer in the memory 708 can be used for storing a number of image frames with variable sizes. There can be a number of images existing in the buffer, which may be configured to have a maximum image frame number, M.

Thus, for the time period, T, the stored data segment can include a past portion with a duration of Tr, which equals to the result of the maximum image frame number, M, divided by the image speed, fps, (i.e. M/fps). Additionally, the data segment can include a current portion with a duration of Tc, where Tc is the difference between the time period, T, and the duration for the past portion Tr (i.e. T−Tr).

Additionally, data processing system 700 can direct the received data to a user terminal for live view 713.

Figure 8:
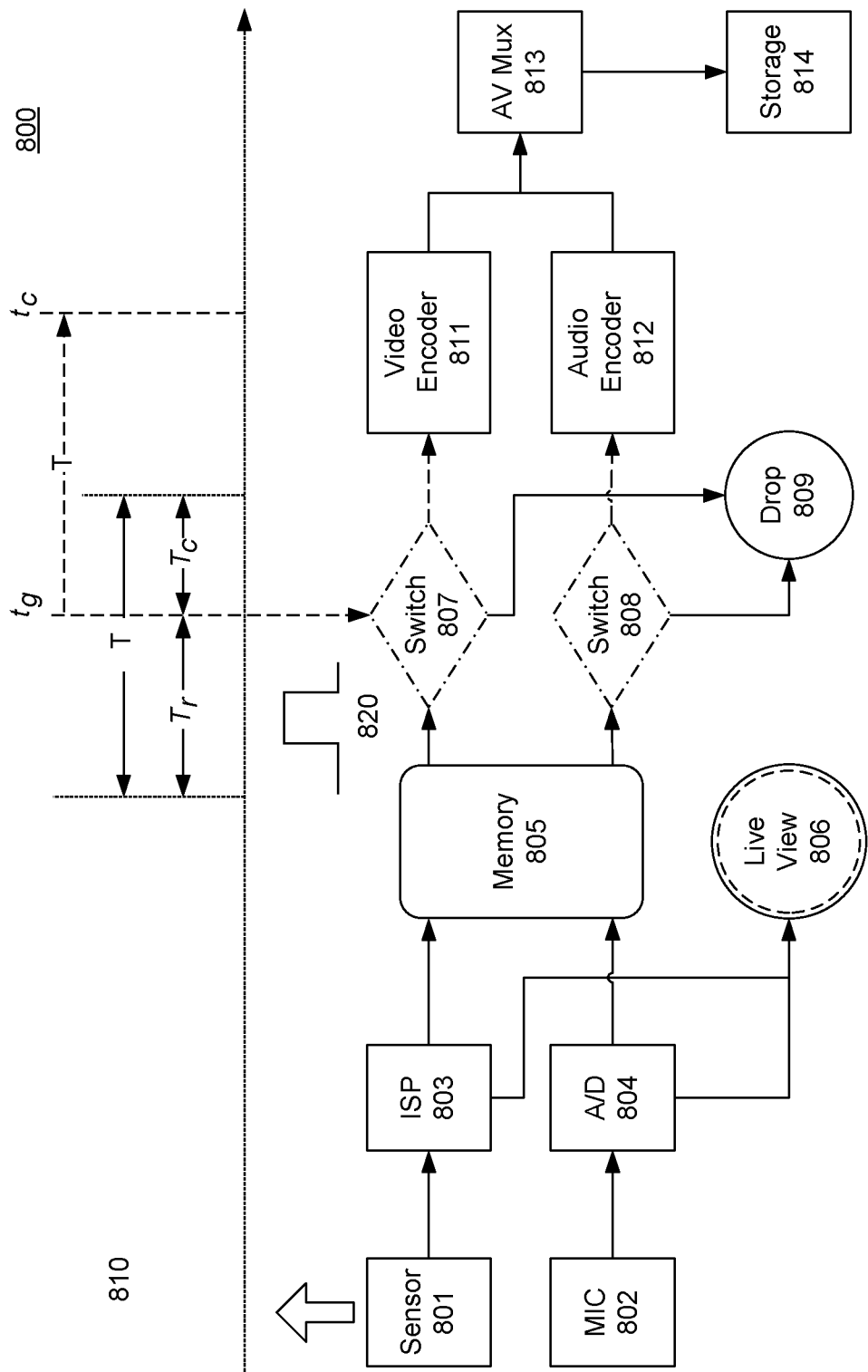
FIG. 8 is an exemplary illustration of backtracking recording optimized in computation load, in accordance with various embodiments of the present invention.

FIG. 8 is an exemplary illustration of backtracking recording optimized in computation load, in accordance with various embodiments of the present invention. As shown in FIG. 8, a data processing system 800 can take advantage of a memory 805 for handling the data received from a data source.

For example, the data processing system 800 can receive various image information from a sensor 801. Then, the data processing system 800 can use an image signal processor (ISP) 803 for transforming the image information into raw video data.

Additionally, the data processing system 800 can receive various analog voice information from a microphone (MIC) 802. Then, the data processing system 800 can use an analog/digital (A/D) converter 804 to convert the analog voice information into raw digital audio data.

In order to optimize the computation load, both the raw video data and raw digital audio data may be saved directly into the memory 802 (i.e. requires more memory). Here, the data processing system 800 can perform various image processing operations on the raw video data and raw digital audio data (e.g. playing backwards), since the raw video data and raw digital audio data has not be encode or compressed.

Furthermore, the data processing system 800 can remove a portion of the data (e.g. one or more image frames) stored in the memory 805 periodically, e.g. after receiving a synchronization signal 820 (i.e. when new data arrives and the buffer is full).

As shown in FIG. 8, the data processing system 800 can include a switch 807 and a switch 808, which are responsible for directing the video data and the audio data out of the memory 805, respectively.

The data processing system 800 can turn on the switches 807-808 after receiving a control signal. When the switches 807-808 are turned on, the data processing system 800 can direct the data to a storage 814. On the other hand, when the switches 807-808 are turned off, the data processing system 800 can drop 804 the data without storing it.

As shown in FIG. 8, the data processing system 800 receives a control signal at a time, tg. Once the switches 807-808 are turned on, the data processing system 800 can maintain the switches 807-808 for a time period, T (i.e. from tg to tc in the time sequence 810).

The data processing system 800 can support backtracking data recording. A buffer in the memory 805 can be used for storing a number of image frames with variable sizes. There can be a number of images existing in the buffer, which may be configured to have a maximum image frame number, M.

Thus, for the time period, T, the stored data segment can include a past portion with a duration of Tr, which equals to the result of the maximum image frame number, M, divided by the image speed, fps, (i.e. M/fps). Additionally, the data segment can include a current portion with a duration of Tc, where Tc is the difference between the time period, T, and the duration for the past portion Tr (i.e. T−Tr).

The data processing system 800 can use one or more encoders to encode the received data before actually saving the encoded data in the storage. Here, the storage 814 can be based on a storage medium that connects to the memory 805, and/or a remote server that connects via a network.

As shown in FIG. 8, the data processing system 800 can use a video encoder 805 for encoding the raw video data from the ISP 803, and use an audio encoder 806 for encoding the audio data from the (A/D) converter 804. Additionally, the data processing system 800 can use a multiplexer, e.g. AV Mux 813, to combine the separate audio data and video data into an audio/video (A/V) data stream.

Additionally, data processing system 800 can direct the received data to a user terminal for live view 806.

Figure 9:
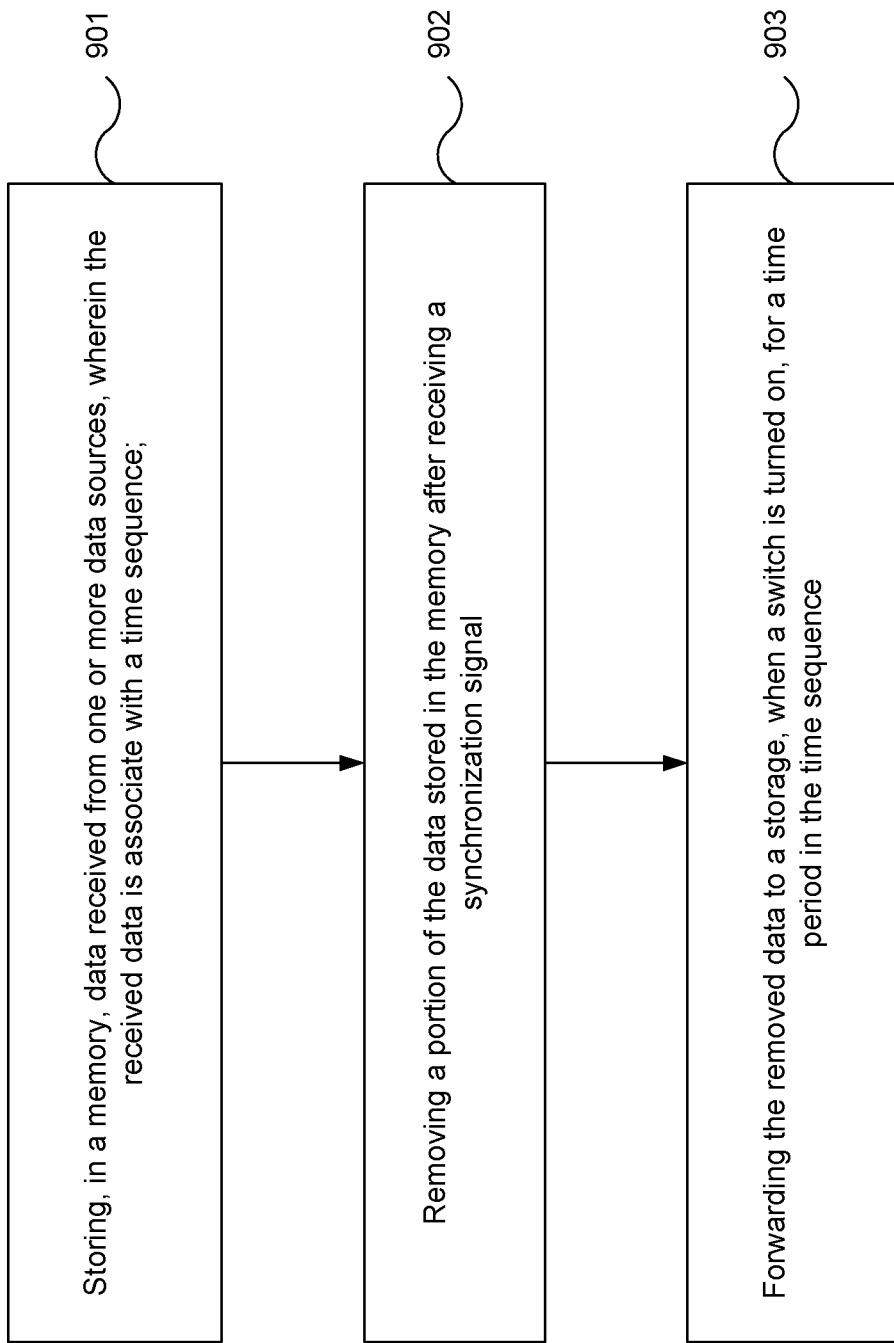
FIG. 9 shows a flowchart of backtracking data recording, in accordance with various embodiments of the present invention.

FIG. 9 shows a flowchart of backtracking data recording, in accordance with various embodiments of the present invention. As shown in FIG. 9, at step 901, a data processor can store, in a memory, data received from one or more data sources, wherein the received data is associate with a time sequence. Then, at step 902, the data processor can remove a portion of the data stored in the memory after receiving a synchronization signal. Furthermore, at step 903, the data processor can forward the removed data to a storage, when a switch is turned on, for a time period in the time sequence.

Data Recording With Tags

Figure 10:
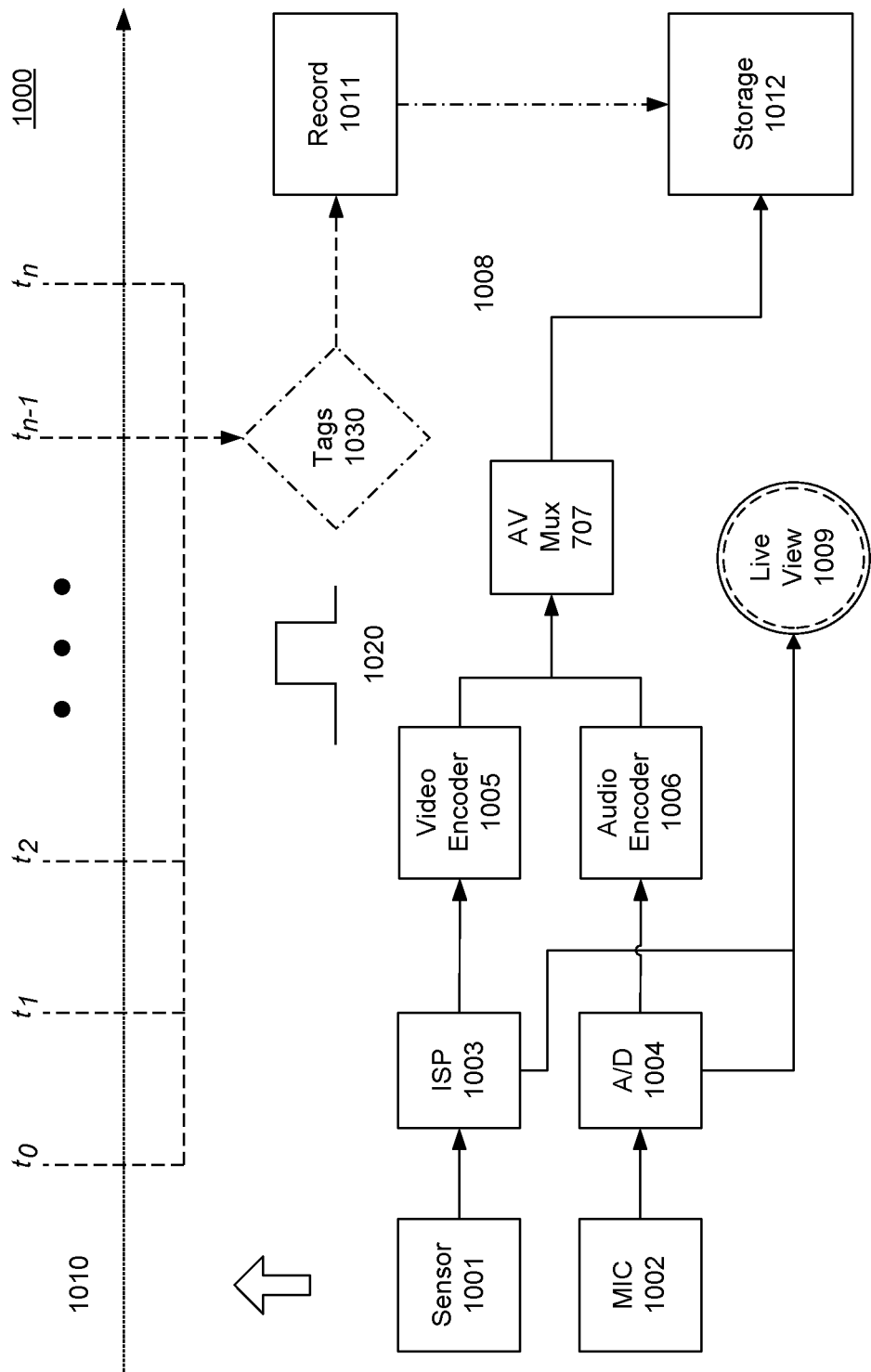
FIG. 10 is an exemplary illustration of data recording with tags, in accordance with various embodiments of the present invention.

FIG. 10 is an exemplary illustration of data recording with tags, in accordance with various embodiments of the present invention. As shown in FIG. 10, a data processing system 1000 can receive a data flow 1008 from a data source.

For example, the data processing system 1000 can receive various image information from a sensor 1001. Then, the data processing system 1000 can use an image signal processor (ISP) 1003 for transforming the image information into raw video data.

Additionally, the data processing system 1000 can receive various analog voice information from a microphone (MIC) 1002. Then, the data processing system 1000 can use an analog/digital (A/D) converter 1004 to convert the analog voice information into digital audio data.

Furthermore, the data processing system 1000 can use various encoder for encoding, or compressing, the received digital data. For example, a video encoder 1005 is used for encoding the raw video data from the ISP 1003, and an audio encoder 1006 is used for encoding the audio data from the (A/D) converter 1004. Then, the data processing system 1000 can use a multiplexer, such as an AV Mux 1007, to combine the audio data and the video data into an audio/video (A/V) stream for the data flow 1008.

Additionally, the data processing system 1000 can export (or save) the audio/video (A/V) stream in the storage 1012. For example, the storage 1012 can be based on a storage medium that connects to the memory, and/or a remote server that connects via a network.

In accordance with various embodiments of the present invention, the data processing system 1000 can take advantage of one or more tags 1030 for handling the data in a data flow 1008 that are received from a data source. For example, the one or more tags 1030 may be applied by the user at the time of recording.

As shown in FIG. 10, the tags 1030 can be associated with one or more timestamps (e.g. t0 to tn), which can be defined in a time sequence 1010. The time sequence 1010 can be defined using a clock time or based on a system defined time.

The data processing system 1000 can assign an image frame count, e.g. a recorded frame number, to each image frame in the received data flow. The recorded frame numbers, which may be defined based on a received frame synchronization signal 1020, can be used as a reference for the system defined time. Also, the timestamp associated with a tag 1030 may correspond to one or more recorded frame numbers.

When a user applies a tag 1030 on the received data flow 1008, the data processing system 1000 may receive a control signal, e.g. a Tigg signal. Alternatively, the data processing system 1000 may generate a control signal in responding to a user request.

Furthermore, the data processing system 1000 can save the timestamps, t0 to tn, in a record 1011 (e.g. in a memory). Based on the timestamps saved in the record 1011, the data processing system 600 can select a subset of the data in the received data flow 1008. Then, the data processing system 1000 can use the selected data for different purposes, such as sharing, playing and storing.

Additionally, the data processing system 1000 can direct data in the received data flow to a user terminal for live view 1009.

Figure 11:
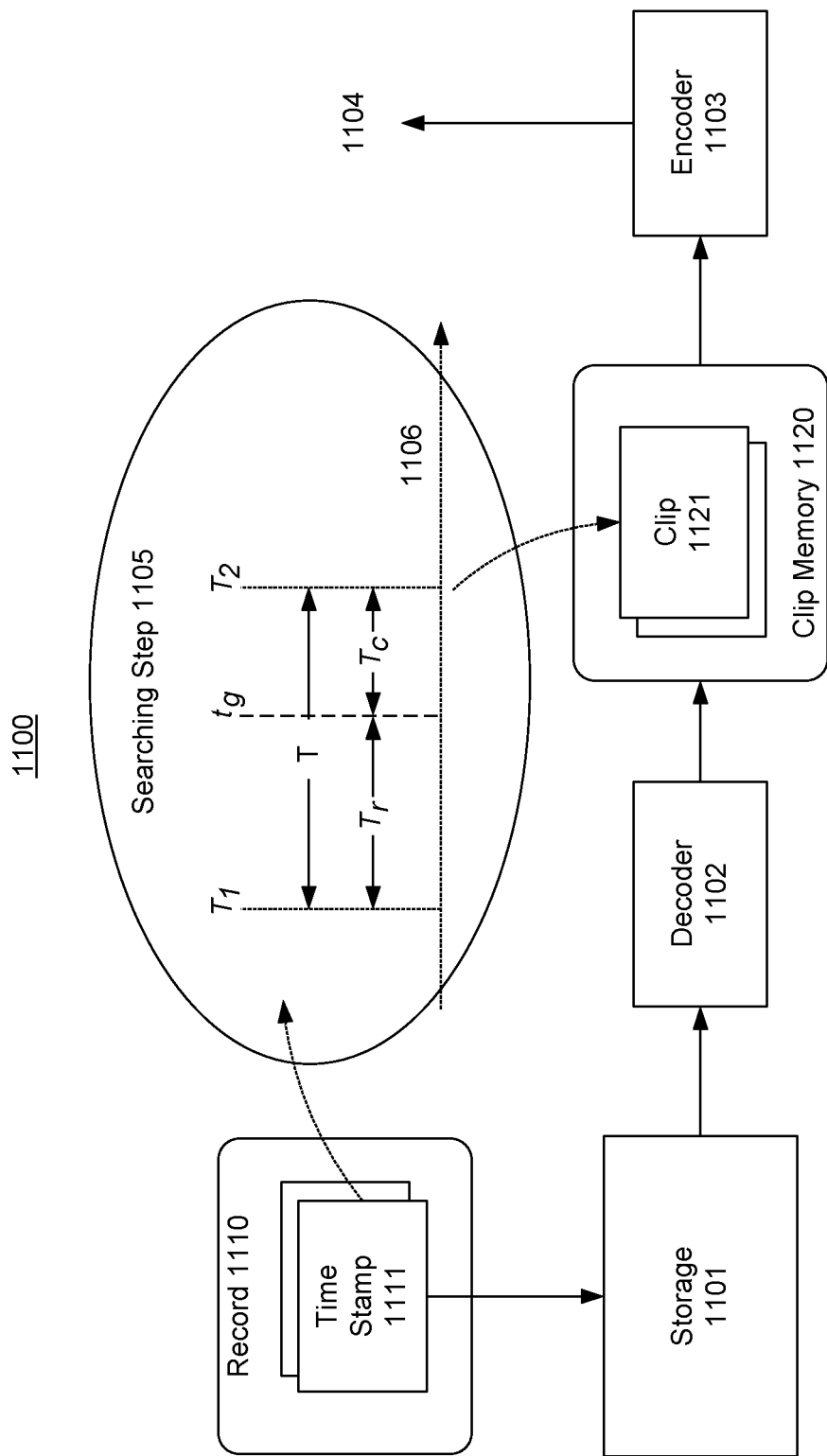
FIG. 11 is an exemplary illustration of exporting from data recording with tags, in accordance with various embodiments of the present invention.

FIG. 11 is an exemplary illustration of exporting from data recording with tags, in accordance with various embodiments of the present invention. As shown in FIG. 11, the data processing system 1100 can transcode data in the storage 1101 based the stored timestamps 1111 in the record 1110.

In accordance with various embodiments of the present invention, the data processing system 1000 can create a data segment, such as a clip 1121 in a clip memory 1120, based on a saved timestamp 1111. For example, the data processing system 1100 can use a decoder 1102 to decode the recorded data in the storage 1101, before creating the clip 1121 in the clip memory 1120 (e.g. in a memory).

As shown in FIG. 11, the data processing system 1100 can employ a searching step 1105 for creating the clip 1121, which may include one or more recorded image frames. For example, the timestamp 1111 may represent a time tg in the time sequence 1106. The data processing system 1100 can determine a time period, T (e.g. from T1 to T2), in the time sequence 1106) and the corresponding recorded frame counts. Then, the data processing system 1100 can determine the clip 1121, which includes one or more image frames recorded before the saved timestamp (i.e. the time period Tr), and/or one or more image frames recorded after the saved timestamp (i.e. the time period Tc).

Furthermore, the data processing system 1100 can traverse the different timestamps saved in the record, and select a data segment for each saved timestamp.

Then, the data processing system 1100 can use an encoder 1103 to create a data stream, e.g. AV stream 1104, based on the clips in the clip memory (i.e. the selected data segments).

Figure 12:
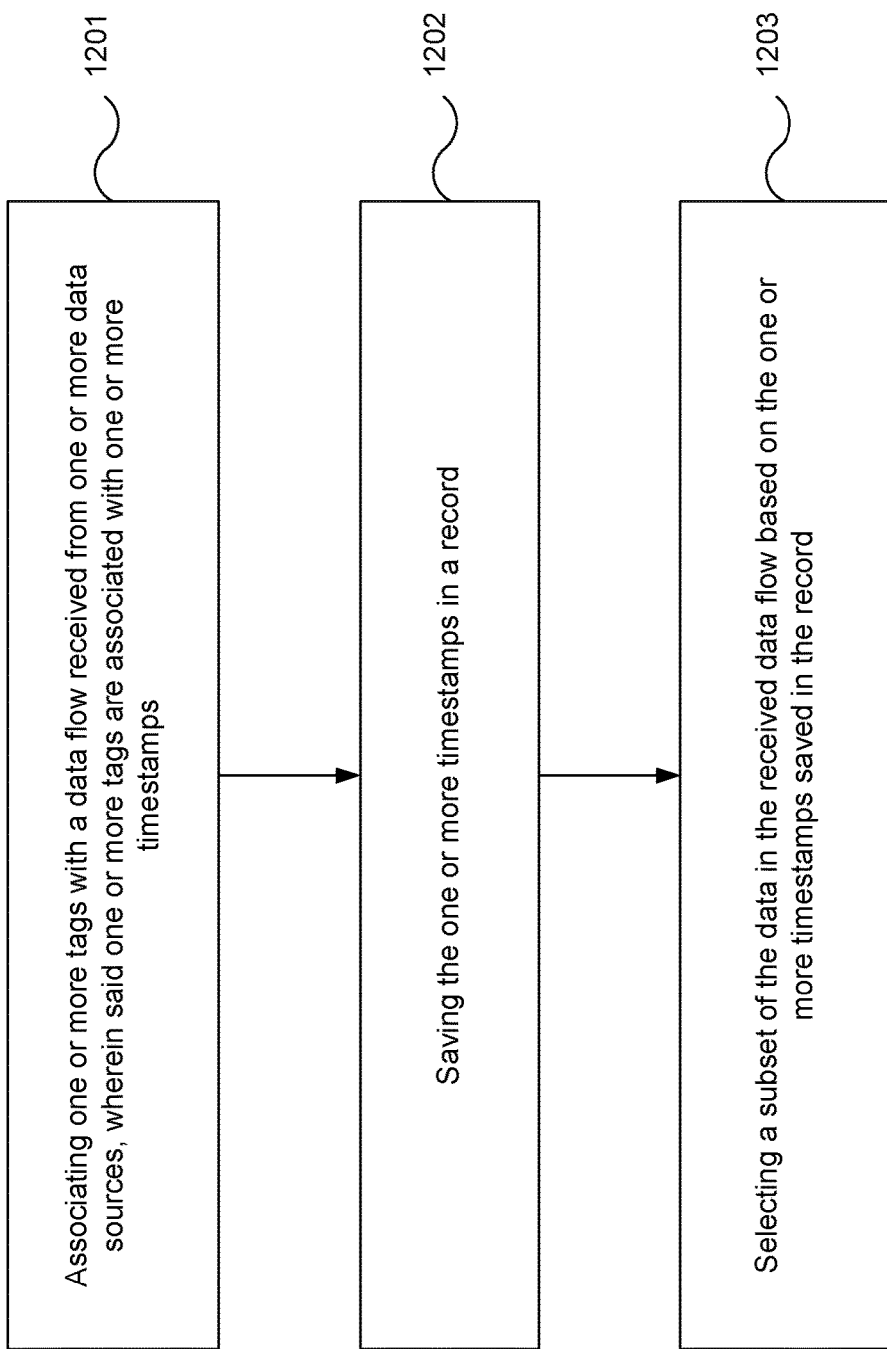
FIG. 12 shows a flowchart of data recording with tags, in accordance with various embodiments of the present invention.

FIG. 12 shows a flowchart of data recording with tags, in accordance with various embodiments of the present invention. As shown in FIG. 12, at step 1201, a data processor can associate one or more tags with a data flow received from one or more data sources, wherein said one or more tags are associated with one or more timestamps. Then, at step 1202, the data processor can save the one or more timestamps in a record. Furthermore, at step 1203, the data processor can select a subset of the data in the received data flow based on the one or more timestamps saved in the record.

In some embodiments, the methods and features described herein thus provide a data processing method comprising receiving data in a data flow from one or more data sources, wherein the data flow is configured based on a time sequence; receiving a control signal, which is associated with a first timestamp, wherein the first timestamp indicates a first time; determining, via a data processor, a first data segment by applying the first timestamp on the data flow, wherein the first data segment is associated with a time period in the time sequence that includes the first time.

In some embodiments, the one or more data sources may be associated with a data capturing device on a stationary object and/or a movable object.

In some embodiments, the data processing method may further comprise using different communication protocols to receive data from the one or more data sources.

In some embodiments, the data flow may contain audio data that are captured using a microphone, video data that are captured using an image sensor, and/or textual data that are captured using a physical or virtual keyboard.

In some embodiments, the time sequence may be defined based on a clock time and/or a system defined time.

In some embodiments, the data processing method may further comprise storing the received data into a buffer in a memory, and removing a portion of the received data stored in the buffer periodically when new data arrives and the buffer is full.

In some embodiments, a size of the buffer may be either preconfigured or dynamically configured based on one or more policies.

In some embodiments, the data processing method may further comprise creating a copy in the memory for the first data segment, before exporting the first data segment.

In some embodiments, the data processing method may further comprise exporting the first data segment by saving the first data segment into a storage medium that is physically connected to the memory, and/or sending the first data segment to a remote server via a network.

In some embodiments, the data processing method may further comprise exporting a plurality of data segments in the data flow, wherein each said data segment is associated with a different time period.

In some embodiments, the control signal may be triggered by a button being pushed, a gesture of a being, a movement of an object, and/or a change of a state, and generated by a user terminal, a motion detector, a state monitor, and/or a data analyzer.

In some embodiments, the data processing method may further comprise transmitting a reduced set of the received data flow to a user terminal for preview and/or initiating recording.

In some embodiments, the received data flow may contain data in multiple data types, while the reduced set of the received data flow may contain data only in one data type.

In some embodiments, the data processing method may further comprise configuring the data source to start transmitting the data flow.

In some embodiments, the systems and features described herein thus provide a data processing apparatus comprising one or more microprocessors and a data processor running on the one or more microprocessors, wherein the data processor operates to receive data in a data flow from one or more data sources, wherein the data flow is configured based on a time sequence; receive a control signal, which is associated with a first timestamp, wherein the first timestamp indicates a first time; determine a first data segment by applying the first timestamp on the data flow, wherein the first data segment is associated with a time period in the time sequence that includes the first time.

In some embodiments, the one or more data sources may be associated with a data capturing device on a stationary object and/or a movable object.

In some embodiments, different communication protocols may be used to receive data from the one or more data sources.

In some embodiments, the data flow may contain audio data that are captured using a microphone, video data that are captured using an image sensor, and/or textual data that are captured using a physical or virtual keyboard.

In some embodiments, the time sequence may be defined based on a clock time and/or a system defined time.

In some embodiments, the data processor may operate to store the received data into a buffer in a memory, and remove a portion of the data stored in the buffer periodically when new data arrives and the buffer is full.

In some embodiments, the size of the buffer may be either preconfigured or dynamically configured based on one or more policies.

In some embodiments, the data processor may operate to create a copy in the memory for the first data segment, before exporting the first data segment.

In some embodiments, the data processor may operate to export the first data segment by saving the first data segment into a storage medium that is physically connected to the memory, and/or send the first data segment to a remote server via a network.

In some embodiments, the data processor may operate to export a plurality of data segments in the data flow, wherein each said data segment is associated with a different time period.

In some embodiments, the control signal may be triggered by a button being pushed, a gesture of a being, a movement of an object, and/or a change of a state, and generated by a user terminal, a motion detector, a state monitor, and/or a data analyzer.

In some embodiments, the data processor may operate to transmit a reduced set of the received data flow to a user terminal for preview and/or initiate recording.

In some embodiments, the received data flow may contain data in multiple data types, while the reduced set of the received data flow may contain data only in one data type.

In some embodiments, the data processor may operate to configure the one or more data sources to start transmitting the data flow.

In some embodiments, the systems and features described herein also provide a non-transitory computer-readable medium with instructions stored thereon, that when executed by a processor, perform the steps comprising: receiving data in a data flow from one or more data sources, wherein the data flow is configured based on a time sequence; receiving a control signal, which is associated with a first timestamp, wherein the first timestamp indicates a first time; determining, via a processor, a first data segment by applying the first timestamp on the data flow, wherein the first data segment is associated with a time period in the time sequence that includes the first time.

In some embodiments, the systems and features described herein also provide a data processing system comprising: a data capturing device on a stationary object and/or a movable object; and a data processor, running on one or more microprocessors, wherein the data processor operates to receive data in a data flow from one or more data sources, wherein the data flow is configured based on a time sequence; receive a control signal, which is associated with a first timestamp, wherein the first timestamp indicates a first time; determine a first data segment by applying the first timestamp on the data flow, wherein the first data segment is associated with a time period in the time sequence that includes the first time.

In some embodiments, the methods and features described herein also provide a data processing method comprising: storing, in a memory, data received from one or more data sources, wherein the received data is associated with a time sequence; removing a portion of the data stored in the memory after receiving a synchronization signal; and forwarding the removed data to a storage, when a switch is turned on, for a time period in the time sequence.

In some embodiments, the one or more data sources may be associated with one or more data capturing devices on a stationary object and/or a movable object.

In some embodiments, the received data may contain video data captured using an image sensor, audio data captured using a microphone, and/or textual data captured using a key board.

In some embodiments, the data processing method may further comprise using different communication protocols to receive data from the one or more data sources.

In some embodiments, the memory may include one of a first-in-first-out (FIFO) protocol memory, a ring buffer, or a list.

In some embodiments, the data processing method may further comprise using one or more encoders to encode the received data before storing the encoded data in the memory, and using a multiplexer to combine audio data and video data into an audio/video (A/V) data stream.

In some embodiments, the data processing method may further comprise using one or more encoders to encode the received data before saving the encoded data in the storage, and using a multiplexer to combine audio data and video data into an audio/video (A/V) data stream.

In some embodiments, the data processing method may further comprise performing one or more image processing operations on the received data before the encoding step.

In some embodiments, the storage may be based on a storage medium that connects to the memory and a remote server that connects via a network.

In some embodiments, the data processing method may further comprise turning on the switch when receiving a control signal, wherein the control signal is triggered by a button being pushed, a gesture of a being, a movement of an object, and/or a change of a state, and generated by a user terminal, a system detector, a state monitor, and/or a data analyzer.

In some embodiments, the received data may contain one or more image frames, wherein the time sequence is associated with an image frame count.

In some embodiments, the data processing method may further comprise providing a buffer in the memory, wherein the buffer is used to store a number of image frames with variable sizes.

In some embodiments, the data processing method may further comprise creating a data segment, which includes a past portion and a current portion.

In some embodiments, the data processing method may further comprise directing the received data to a user terminal for live view.

In some embodiments, the systems and features described herein also provide a data processing apparatus comprising one or more microprocessors; a data processor, running on the one or more microprocessors, wherein the data processor operates to store, in a memory, data received from one or more data sources in a time sequence; remove a portion of the data stored in the memory after receiving a synchronization signal; and forward the removed data to a storage, when a switch is turned on, for a time period in the time sequence.

In some embodiments, the one or more data sources may be associated with one or more data capturing devices on a stationary object and/or a movable object.

In some embodiments, the received data may contain video data captured using an image sensor, audio data captured using a microphone, and/or textual data captured using a key board.

In some embodiments, different communication protocols may be used to receive data from the one or more data sources.

In some embodiments, the memory may be based on a first-in-first-out (FIFO) protocol, or the memory is a ring buffer or a list.

In some embodiments, one or more encoders may be used to encode the received data before storing the encoded data in the memory.

In some embodiments, one or more encoders may be used to encode the received data before saving the encoded data in the storage.

In some embodiments, a multiplexer may be used to combine audio data and video data into an audio/video (A/V) data stream.

In some embodiments, the storage may be based on a storage medium that connects to the memory and a remote server that connects via a network.

In some embodiments, the data processor may operate to turn on the switch when receiving a control signal, wherein the control signal is triggered by a button being pushed, a gesture of a being, a movement of an object, and/or a change of a state, and generated by a user terminal, a system detector, a state monitor, and/or a data analyzer.

In some embodiments, the received data may contain one or more image frames, wherein the time sequence is associated with an image frame count.

In some embodiments, the data processing apparatus may further comprise a buffer in the memory, wherein the buffer is used to store a number of image frames with variable sizes.

In some embodiments, the data processor may operate to create a data segment, which includes a past portion and a current portion.

In some embodiments, the data processor may operate to direct the received data to a user terminal for live view.

In some embodiments, the systems and features described herein also provide a non-transitory computer-readable medium with instructions stored thereon, that when executed by a processor, perform the steps comprising: storing, in a memory, data received from one or more data sources, wherein the received data is associate with a time sequence; removing a portion of the data stored in the memory after receiving a synchronization signal; and forwarding the removed data to a storage, when a switch is turned on, for a time period in the time sequence.

In some embodiments, the systems and features described herein also provide a data processing system comprising: a data capturing device on a stationary object and/or a movable object; and a data processor, running on one or more microprocessors, wherein the data processor operates to store, in a memory, data received from one or more data sources in a time sequence; remove a portion of the data stored in the memory after receiving a synchronization signal; and forward the removed data to a storage, when a switch is turned on, for a time period in the time sequence.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for backtracking data recording, comprising:
receiving a data flow from one or more data sources;
storing the data flow in a first storage medium;
receiving, at a first time, a control signal to transfer data from the first storage medium to a second storage medium, wherein the second storage medium is configured to receive data during a predetermined duration of time;
determining a reference time period based on at least one of a characteristic of the data flow and a characteristic of the first storage medium;
determining a first reference time by subtracting the reference time period from the first time;
determining a second reference time by adding the predetermined duration of time to the first reference time;
selecting a subset of data in the data flow corresponding to the predetermined duration of time between the first reference time and the second reference time; and
transferring the subset of data from the first storage medium to the second storage medium.

2. The method of claim 1, wherein the one or more data sources are configured to capture information for at least one of an unmanned aircraft, an unmanned vehicle, a hand held device, or a robot.

3. The method of claim 1, wherein the data flow includes at least one of:
video data captured using an image sensor,
audio data captured using a microphone, and
textual data captured using a keyboard.

4. The method of claim 1, wherein the data flow comprises data received from the one or more data sources using a plurality of communication protocols.

5. The method of claim 1, further comprising:
encoding data in the data flow with one or more encoders; and
storing the encoded data in the first storage medium.

6. The method of claim 5, wherein each data source is associated with a separate encoder.

7. The method of claim 1, further comprising using a multiplexer to form the data flow by combining received audio data and received video data.

8. The method of claim 1, further comprising outputting data of the data stream on a user terminal in real time.

9. The method of claim 1, wherein the first storage medium is configured to store a maximum number of image frames, and wherein the reference time period is based on the maximum number of images frames of the first storage medium.

10. The method of claim 1, wherein the reference time period is based on a data rate of the data flow.

11. The method of claim 10, wherein the data rate is an image speed of the data flow.

12. The method of claim 1, wherein the first storage medium is configured to store the data flow in a first-in, first-out buffer.

13. The method of claim 1, wherein the selected subset of data includes:
at least one image frame recorded before receipt of the control signal, and
at least one image frame recorded after receipt of the control signal.

14. The method of claim 1, further comprising generating a data stream based on the subset of data.

15. A data processing apparatus, comprising:
at least one memory configured to store instructions for execution by one or more processors in the data processing apparatus; and
one or more processors configured to execute the instructions stored in the at least one memory, the instructions when executed by the one or more processors configure the data processing apparatus to:
receive a data flow from one or more data sources;
store the data flow in a first storage medium;
receive, at a first time, a control signal to transfer data from the first storage medium to a second storage medium, wherein the second storage medium is configured to receive data during a predetermined duration of time;
determine a reference time period based on at least one of a characteristic of the data flow and a characteristic of the first storage medium;
determine a first reference time by subtracting the reference time period from the first time;
determine a second reference time by adding the predetermined duration of time to the first reference time;
select a subset of data in the data flow corresponding to the predetermined duration of time between the first reference time and the second reference time; and
transfer the subset of data from the first storage medium to the second storage medium.

16. The apparatus of claim 15, wherein the one or more data sources are configured to capture information for at least one of an unmanned aircraft, an unmanned vehicle, a hand held device, or a robot.

17. The apparatus of claim 15, wherein the data flow includes at least one of:
video data captured using an image sensor,
audio data captured using a microphone, and
textual data captured using a keyboard.

18. The apparatus of claim 15, wherein the data processor is configured to receive data of the data flow from the one or more data sources using a plurality of communication protocols.

19. The apparatus of claim 15, wherein the data processor is configured to:
encode data in the data flow with one or more encoders; and
store the encoded data in the first storage medium.

20. The apparatus of claim 19, wherein each data source is associated with a separate encoder.

21. The apparatus of claim 15, wherein the data processor is configured to use a multiplexer to form the data flow by combining received audio data and received video data.

22. The apparatus of claim 15, wherein the data processor is configured to output data of the data stream on a user terminal in real time.

23. The apparatus of claim 15, wherein the first storage medium is configured to store a maximum number of image frames, and wherein the reference time period is based on the maximum number of images frames of the first storage medium.

24. The apparatus of claim 15, wherein the reference time period is based on a data rate of the data flow.

25. The apparatus of claim 24, wherein the data rate is an image speed of the data flow.

26. The apparatus of claim 15, wherein the first storage medium is configured to store the data flow in a first-in, first-out buffer.

27. The apparatus of claim 15, wherein the selected subset of data includes:
at least one image frame recorded before receipt of the control signal, and
at least one image frame recorded after receipt of the control signal.

28. The apparatus of claim 15, wherein the data processor is configured to generate a data stream based on the subset of data.

29. A non-transitory computer-readable medium with instructions stored thereon, that when executed by a processor, perform the steps comprising:
receiving a data flow from one or more data sources;
storing the data flow in a first storage medium;
receiving, at a first time, a control signal to transfer data from the first storage medium to a second storage medium, wherein the second storage medium is configured to receive data during a predetermined duration of time;
determining a reference time period based on at least one of a characteristic of the data flow and a characteristic of the first storage medium;
determining a first reference time by subtracting the reference time period from the first time;
determining a second reference time by adding the predetermined duration of time to the first reference time;
selecting a subset of data in the data flow corresponding to the predetermined duration of time between the first reference time and the second reference time; and
transferring the subset of data from the first storage medium to the second storage medium.

30. A data processing system, comprising:
a data capturing device on a movable object, the movable object comprising at least one of an unmanned aircraft, an unmanned vehicle, a hand held device, or a robot;
at least one memory configured to store instructions for execution on one or more processors in the data processing system; and
one or more processors configured to execute the instructions stored in the at least one memory, the instructions when executed by the one or more processors configure the data processing system to:
receive a data flow from one or more data sources;
store the data flow in a first storage medium;
receive, at a first time, a control signal to transfer data from the first storage medium to a second storage medium, wherein the second storage medium is configured to receive data during a predetermined duration of time;

determine a reference time period based on at least one of a characteristic of the data flow and a characteristic of the first storage medium;

determine a first reference time by subtracting the reference time period from the first time;

determine a second reference time by adding the predetermined duration of time to the first reference time;

select a subset of data in the data flow corresponding to the predetermined duration of time between the first reference time and the second reference time; and transfer the subset of data from the first storage medium to the second storage medium.

\* \* \* \* \*